United States Patent
Miller et al.

(10) Patent No.: US 9,575,678 B2
(45) Date of Patent: Feb. 21, 2017

(54) HIERARCHICAL ALLOCATION FOR FILE SYSTEM STORAGE DEVICE

(71) Applicant: MICROSOFT TECHNOLOGY LICENSING, LLC, Redmond, WA (US)

(72) Inventors: Thomas J. Miller, Yarrow Point, WA (US); Jonathan M. Cargille, Seattle, WA (US); William R. Tipton, Seattle, WA (US); Surendra Verma, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/970,391

(22) Filed: Dec. 15, 2015

(65) Prior Publication Data

US 2016/0098224 A1    Apr. 7, 2016

Related U.S. Application Data

(63) Continuation of application No. 12/816,419, filed on Jun. 16, 2010, now Pat. No. 9,218,135.

(51) Int. Cl.
   *G06F 12/00*    (2006.01)
   *G06F 3/06*    (2006.01)
   *G06F 17/30*    (2006.01)

(52) U.S. Cl.
   CPC .......... *G06F 3/0631* (2013.01); *G06F 3/0604* (2013.01); *G06F 3/0613* (2013.01); *G06F 3/0644* (2013.01);
   (Continued)

(58) Field of Classification Search
   CPC .... G06F 3/0631; G06F 3/0613; G06F 3/0644; G06F 3/0676; G06F 3/0604; G06F 3/0689; G06F 17/30221
   See application file for complete search history.

(56) References Cited

U.S. PATENT DOCUMENTS 4,791,623 A * 12/1988 Deiotte ............. G06F 17/30955
                                                    360/48
5,561,786 A    10/1996 Morse
(Continued)

FOREIGN PATENT DOCUMENTS

CN       1950802 A     4/2007
CN     101320351 A    12/2008
(Continued)

OTHER PUBLICATIONS

CN Notice on the First Office Action for Application No. 201110161353.6, Feb. 15, 2015.
(Continued)

*Primary Examiner* — Kalpit Parikh
(74) *Attorney, Agent, or Firm* — Sunah Lee; Dan Choi; Micky Minhas

(57) ABSTRACT

Aspects of the subject matter described herein relate to storage allocation. In aspects, a hierarchical data structure is used to track allocation data for storage managed by a file system. The hierarchical data structure may have multiple levels with each level having data regarding a different granularity of storage. Portions of the hierarchical data structure may be locked independently of other portions of the hierarchical data structure. The hierarchical data structure may indicate that one or more portions of storage are for exclusive use by a directory. Extra space may be reserved in allocated space in anticipation of subsequent operations. Allocation requestors may obtain storage allocation from regions associated with different levels of the hierarchical data structure.

20 Claims, 6 Drawing Sheets

(52) U.S. Cl.
CPC ........... *G06F 3/0676* (2013.01); *G06F 3/0689* (2013.01); *G06F 17/30221* (2013.01)

(56) References Cited

U.S. PATENT DOCUMENTS

| | | | |
|---|---|---|---|
| 5,784,699 | A | 7/1998 | McMahon et al. |
| 5,897,661 | A | 4/1999 | Baranovsky et al. |
| 6,175,900 | B1 | 1/2001 | Forin et al. |
| 6,874,062 | B1* | 3/2005 | Goldberg ............ G06F 3/0613 707/999.003 |
| 7,246,216 | B2 | 7/2007 | Swan |
| 7,315,894 | B2 | 1/2008 | Huntington et al. |
| 2002/0049810 | A1 | 4/2002 | Fitzgerald et al. |
| 2004/0186976 | A1 | 9/2004 | Bayt |
| 2004/0221120 | A1 | 11/2004 | Abrashkevich et al. |
| 2005/0015378 | A1 | 1/2005 | Gammel et al. |
| 2005/0216691 | A1* | 9/2005 | Michael ............... G06F 12/023 711/170 |
| 2005/0268049 | A1 | 12/2005 | De Lange |
| 2007/0067366 | A1 | 3/2007 | Landis |
| 2007/0156997 | A1 | 7/2007 | Boule |
| 2007/0214314 | A1 | 9/2007 | Reuter |
| 2007/0260842 | A1 | 11/2007 | Faibish et al. |
| 2008/0183958 | A1 | 7/2008 | Cheriton |
| 2008/0208802 | A1 | 8/2008 | Bhattacharjee |
| 2008/0263259 | A1 | 10/2008 | Sadovsky et al. |
| 2009/0234897 | A1 | 9/2009 | Qi |
| 2010/0100673 | A1 | 4/2010 | Cheriton |
| 2010/0125583 | A1 | 5/2010 | Casper |
| 2010/0312984 | A1* | 12/2010 | Robin ................. G06F 12/023 711/171 |

FOREIGN PATENT DOCUMENTS

| | | |
|---|---|---|
| CN | 101329655 A | 12/2008 |
| CN | 101488919 A | 7/2009 |
| EP | 0632365 A2 | 1/1995 |

OTHER PUBLICATIONS

Berger, "Hoard: A Scalable Memory Allocator for Multithreaded Applications", Proceedings of the 9th International Conference on Architectural Support for Programming Languages and Operating Systems (ASPLOS'00), Nov. 12-15, 2000.

Kim, "An Effective Flash Memory Manager for Reliable Flash Memory Space Management", IEICE Transactions on Information and Systems, vol. E85-D, No. 6, Jun. 2002.

Wikipedia, "B-tree", captured on archive.org on Feb. 9, 2010.

Wikipedia, "Buddy memory allocation", captured on archive.org on Nov. 14, 2009.

CN First Office Action for Application No. 201180029558.7, Aug. 5, 2013.

CN Second Office Action for Application No. 201180029558.7, Feb. 24, 2014.

"International Search Report", Mailed Date: Feb. 9, 2012, Application No. PCT/US2011/039073, Filed Date: Jun. 3, 2011, pp. 8.

U.S. Appl. No. 12/816,419, filed Jun. 16, 2010, Miller.

U.S. Appl. No. 12/792,734, filed Jun. 3, 2010, Reynya.

"Search Report Issued in European Patent Application No. 11796172.2", Mailed Date: Sep. 9, 2016, (9 Pages total).

* cited by examiner

HIERARCHICAL ALLOCATION FOR FILE
SYSTEM STORAGE DEVICE

RELATED APPLICATIONS

This Application is a Continuation of, and claims benefit from, U.S. patent application Ser. No. 12/816,419 that was filed on Jun. 16, 2010, and that is incorporated herein by reference in its entirety.

BACKGROUND

Among other things, a file system is responsible for managing the free space of a storage device. To do this, the file system may maintain a global linear bitmap that corresponds to space on the storage device. Each hit of the bitmap may correspond to a chunk of space on the storage device. If a bit is set, this may indicate that the corresponding chunk of space is used. If the bit is not set, this may indicate that the corresponding chunk of space is not used. With the increasing size of storage devices, this approach becomes inefficient.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to storage allocation. In aspects, a hierarchical data structure is used to track allocation data for storage managed by a file system. The hierarchical data structure may have multiple levels with each level having data regarding a different granularity of storage. Portions of the hierarchical data structure may be locked independently of other portions of the hierarchical data structure. The hierarchical data structure may indicate that one or more portions of storage are for exclusive use for a file system object. Extra space may be reserved in allocated space in anticipation of subsequent operations. Allocation requestors may obtain storage allocation from regions associated with different levels of the hierarchical data structure.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly' indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

Exemplary Operating Environment

Figure 1:
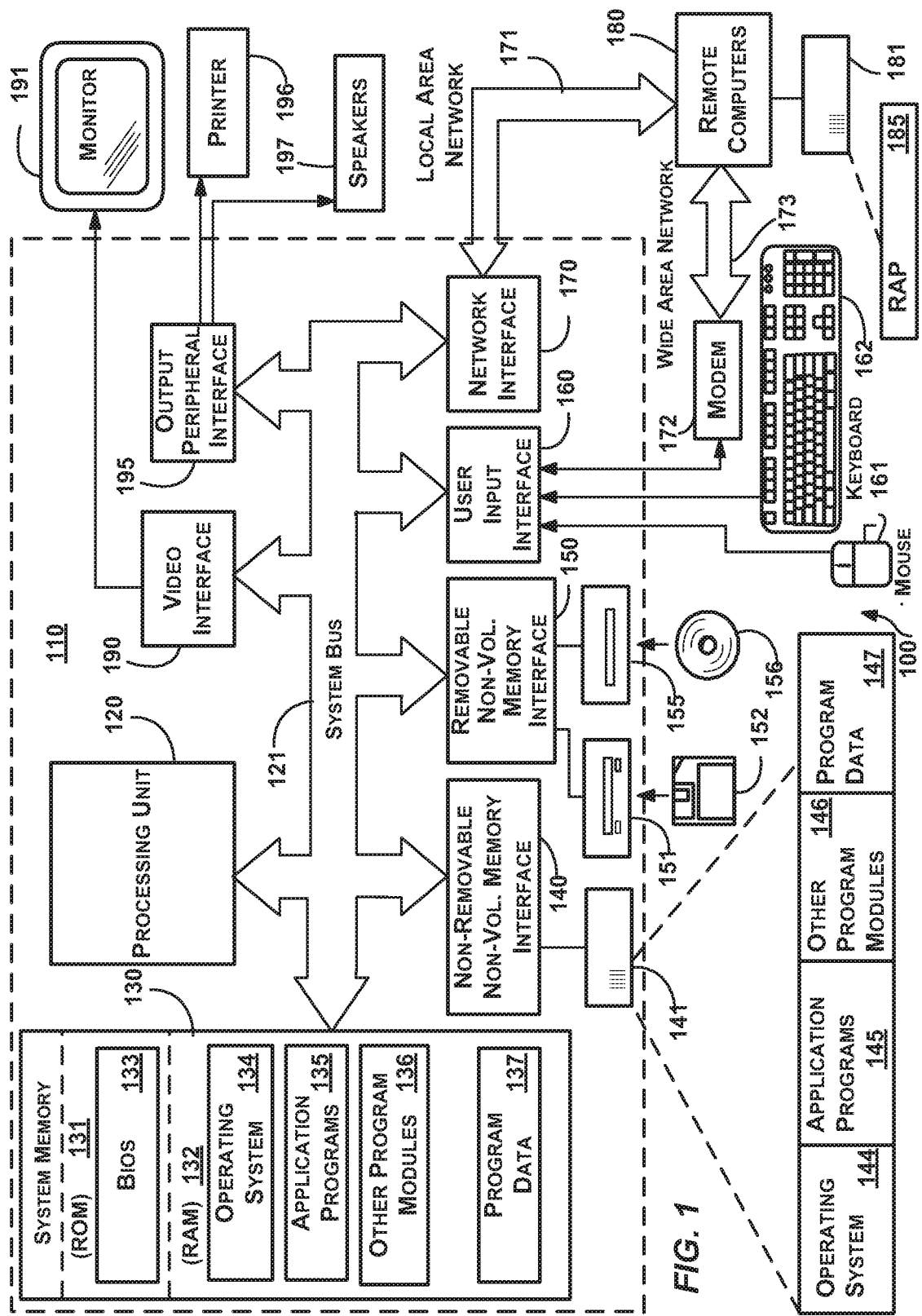
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network. PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above, systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and non-volatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes, to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a AN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Storage Management

Figure 2:
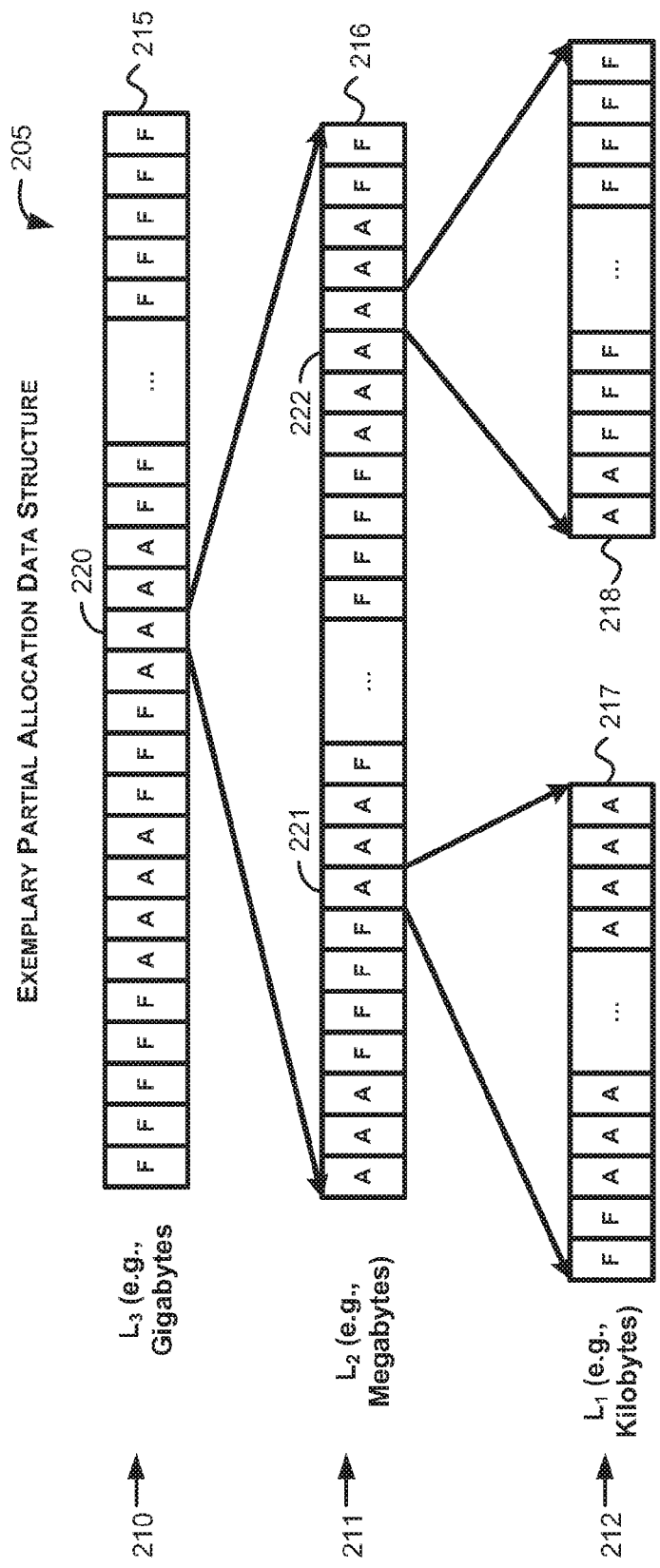
FIG. 2 is a block diagram that illustrates a partial allocation data structure in accordance with aspects of the subject matter described herein.

As mentioned previously, using a global linear bitmap for allocating storage on a file system may become inefficient. FIG. 2 is a block diagram that illustrates a partial allocation data structure in accordance with aspects of the subject matter described herein. The allocation data structure 205 is hierarchical and may include any number of levels. As illustrated, the allocation data structure includes three levels 210-212. Level 210 may be said to be higher than level 211 which may be said to be higher than level 212.

Each of the levels may include one or more nodes that indicate allocation data for different granularities (e.g., sizes) of storage. For example, level 210 may include one or more nodes that indicate allocation data in terms of gigabytes, level 211 may include one or more nodes that indicate allocation data in terms of megabytes, and level 212 may include one or more nodes that indicate allocation data in terms of kilobytes. Note that the use of gigabytes, megabytes, and kilobytes is exemplary only and is not intended to limit aspects of the subject matter described herein to just these sizes. Similarly, even though three levels are illustrated, in other embodiments, there may be two, four, or more levels.

Each node may indicate allocation data according to a bitmap, array, range map, or other data structure that has data representing the allocation status of the node. For example, if the size of the storage is 1000 gigabytes, the node 215 may include a bitmap that includes 1000 bits—one bit for each gigabyte of the storage. Similarly, if the size of a region represented by a node at level 211 is 1 gigabyte and the size of allocation units at the level 211 is 1 megabyte, the node 216 may include 1024 bits to represent 1024 megabytes of storage. Similarly, if the size of a region represented by a node at level 212 is 1 megabyte and the size of allocation units at the level 212 is 1 kilobyte, the nodes 217 and 218 may each include 1024 bits to represent 1024 kilobytes of storage.

Figure 3:
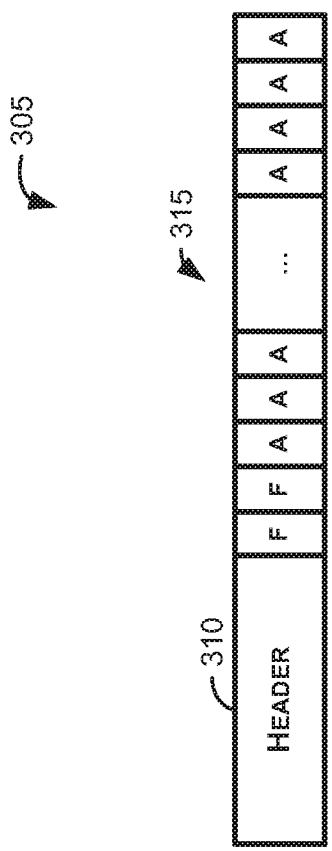
FIG. 3 is a block diagram that generally represents an exemplary data structure that may be used to track allocation data for a region in accordance with aspects of the subject matter described herein.

FIG. 3 is a block diagram that generally represents an exemplary data structure that may be used to track allocation data for a region in accordance with aspects of the subject matter described herein. The data structure may correspond to a node of FIG. 2. The data structure 305 includes a header 310 and a bitmap 315. The header 310 may include, for example, one or more of the following: 1) a value indicating where the region corresponding to the data structure resides on physical storage; 2) the size of the region; 3) the number of bits in the bitmap 315; 4) the number of bytes or other storage measurements represented by each bit (also known as the allocation size of allocation units); 5) the number of free bits in the bitmap 315—which indicates the non-allocated space for the data structure; 6) the largest contiguous number of bits in the bitmap 315—which indicates the largest contiguous size of non-allocated space for the data structure; 7) data regarding whether the region is within one or more snapshots of a volume and identifier (s) of the snapshot(s); 8) other data and the like.

Returning to FIG. 2, the "fan out" from one level to another may be the same or different from level to level. Fan out refers to the number of allocation units that a lower level node has for a single allocation unit of an upper level. For example, an upper level node may represent a gigabyte with 1 bit while a node directly beneath the upper level node may divide the gigabyte into N regions and represent these N regions with N bits. In implementation, the size of a region represented by a node on an upper level may be divisible (e.g., with no remainder) by the size of a region represented by a node directly beneath the upper level node.

In one implementation, allocation of storage may be performed by a monolithic allocator that uses a data structure such as the allocation data structure 205 to determine free portions (sometimes referred to as non-allocated portions) of a storage device and allocate therefrom. In another implementation, the allocation of storage may be performed by a group of hierarchical objects (sometimes called allocators) that may be responsible for allocating certain sized allocation units from the storage. In this implementation, an allocator may be assigned to manage storage represented by one or more nodes of an allocation data structure. Each allocator may be responsible for maintaining allocation data for the storage the allocator manages. In this implementation, the allocation data structure 205 may be represented by the collection of data structures managed by the allocators.

An allocator may include or be comprised of one or more components that allocate and de-allocate memory. In one embodiment, each allocator may be implemented as a separate software object. In another embodiment, one or more components may implement multiple allocators or a single monolithic allocator. As used herein, the term component is to be read to include all or a portion of a device, a collection of one or more software modules or portions thereof, some combination of one or more software modules or portions thereof and one or more devices or portions thereof, and the like.

From a conceptual viewpoint, it may be easier to visualize a hierarchy of allocators rather than a monolithic allocator. Although this viewpoint is sometimes used when describing aspects of the subject matter herein, there is no intention to limit aspects of the subject matter described herein to multiple discrete allocators that allocate blocks. Indeed, herein, where references are made to multiple allocators, these references are also to be construed, in other embodiments, to cover a single monolithic allocator that performs the actions indicated. Thus a "hierarchy" of allocators may refer to a single monolithic allocator that allocates blocks of storage in a similar fashion as the hierarchy of allocators.

When an allocator receives an allocation request, the allocator may search data structures corresponding to one or more regions managed by the allocator to find sufficient storage to satisfy the request. If the allocator is unable to find enough total free storage or even enough "suitable" free storage in those regions, the allocator may make an allocation request of a higher level allocator. "Suitable" storage may refer to storage that has blocks that meet contiguity criteria, blocks that meet locality criteria, or blocks that meet some other criteria.

Contiguity criteria refer to the closeness of the blocks of storage to each other. For disk drives and other storage devices, having blocks right next to each other or at least in close proximity may speed access to the blocks. A strict contiguity criterion is to have all blocks allocated be physically contiguous with each other on the physical storage device. A more relaxed contiguity criterion is to have the allocated blocks be "near" contiguous in which adjacent blocks are within a set threshold of each other. In one exemplary near contiguous criterion, each block to allocate may be no more than X blocks from an adjacent block of the allocation. Contiguity criteria may refer to average and mean criteria with respect to blocks to allocate for an allocation request. For example, the average distance between adjacent blocks may not exceed a selected average and/or mean.

Locality criteria may refer to blocks that are at or near a specified physical location of storage. For example, some applications may seek to have blocks allocated from a specific physical portion of storage. These applications may provide a "hint" of a desired location on the storage for allocation space. In response, a search may be made of existing free space at one or more levels of a hierarchical data structure. The search may proceed by searching for large enough regions according to proximity to the "hinted" (e.g., desired) location. An allocator may then provide an indication of the closest free space to the desired location.

The criteria indicated above are not intended to be all-inclusive or exhaustive of criteria that may be applied when attempting to allocate storage. Based on the teachings herein, those skilled in the art may recognize other criteria that may be helpful in allocating storage without departing from the spirit or scope of aspects of the subject matter described herein.

When a higher level allocator receives an allocation request from a lower level allocator, the higher level allocator may search a data structure corresponding to one or more regions managed by the higher level allocator, allocate storage from the region, update the data structure to indicate the allocation, and provide a handle to the allocated storage to the lower level allocator. The handle may include or reference data that indicates at least a location of the allocated storage. In conjunction with receiving the handle, the lower level allocator may initialize a data structure to account for the allocated space from the parent allocator and may begin allocating space therefrom.

For example, if an allocator corresponding to the node 217 is unable to find, enough free space to satisfy an allocation request, the allocator may send an allocation request to the allocator corresponding to the node 216. In response, this parent allocator may find a region of available storage, mark the storage as allocated, and return a handle to the storage to the requesting allocator. In response, the requesting allocator may initialize a data structure (e.g., another node) corresponding to the returned storage to indicate that the storage is free, may satisfy any pending allocation request from any free storage managed by the allocator including the returned storage and other storage managed by the allocator, and may update data structure(s) as appropriate.

If the higher level allocator is unable to find enough storage, it may make an allocation request of a yet higher level allocator and so on until either enough storage is found or it is determined that there is not enough storage available to satisfy an allocation request.

Freeing space proceeds similarly to allocating space but in the opposite direction. For example, when space in a region is freed (e.g., a file is deleted or truncated), an allocator may return the space to a parent allocator, may hold onto the space in anticipation of subsequent allocation requests, or may take some other action. If the space returned makes the parent's region that includes the space completely free, the parent may return the free region to its parent (if any), and so on until an allocator associated with a top level of the hierarchical data structure is reached.

In one embodiment, a storage consumer may explicitly request storage from any level of the hierarchical data structure. For example, a storage consumer that needs significant storage (e.g., gigabytes), may make an allocation request that is satisfied directly by an allocator associated with the node 215. As another example, a consumer may explicitly request an allocation of storage from an allocator associated with the node 216.

In another embodiment, a storage consumer may provide a desired allocation size and allow an allocation manager (or monolithic storage allocator) to determine the appropriate level from which to allocate storage. For example, a storage consumer may request 10 kilobytes of storage without specifying a specific level from which the storage is to be allocated. In response, the allocation manager may determine a level of the hierarchical data structure for allocating storage for the request and may send a request to allocate the storage to an appropriate allocator.

In the case of a monolithic storage allocator, the monolithic storage allocator may traverse the allocation data structure 205 to determine an appropriate level from which to allocate storage and may allocate storage therefrom in response to an allocation request. Determining an appropriate level may be based on the size of storage requested by the allocation request, availability of storage of each level, contiguity of storage available at each level, other criteria, and the like.

For example, for a request of multiple gigabytes, an appropriate level may be the level 210. As another example, for a request of several megabytes, the appropriate level may be the level 211. As another example, for a request of 500 megabytes, the appropriate level may be the level 210 or the level 211.

Allocated space of a level that is allocated to an end consumer (e.g., such as an application) may have no additional information in lower levels of the data structure 205. For example, if an application is allocated 10 gigabytes directly from the level 210, this may be indicated by data in the node 215 and may not have additional information in nodes of the levels 211-212.

When space of a level is allocated to a node at a lower level, the allocation of that space may be further defined by data at a lower level. For example, the data at location 220 indicates that as far as the node 215 is concerned, the storage corresponding to the location 220 is allocated. In other words, the complete block of storage corresponding to the location 220 may not be allocated to another allocation requestor until that storage has been freed and returned to the node 215.

Furthermore, even though storage has been allocated from a particular node at a particular level, this does not mean that all the storage allocated is currently allocated to an end consumer of the storage. For example, the allocation indicated by location 220 is further defined by data in the node 216 of the level 211. The node 216 indicates that portions of the storage are allocated from node 216's perspective and that other portions of the storage are not allocated. Again, portions such as those at locations 221 and 222 that allocated to lower level allocators may be further defined by data in the lower level.

The labels "A" and "F" in the nodes 215-218 indicate allocation state of a storage associated with the nodes 215-218. For example, an "F" may correspond to a contiguous region on the storage that is free while an "A" may correspond to a contiguous region on the storage that is partially or completely allocated. A region is partially allocated if the region has been allocated to one or more lower level allocators and there is still non-allocated space left in the region. A region is completely allocated if the region has been allocated to an end consumer or if the region has been allocated to one or more lower level allocators and all space in the lower level allocators has been allocated to end consumers. The labels "A" and "F" are for convenience only and the information indicated by these labels may be represented by a bitmap or other data as indicated previously.

Some regions may be private and may only be allocated for certain file system objects or portions thereof. For example, in one embodiment, one or more regions may be assigned to a directory. When a file is created or extended in the directory, space may be allocated from a region private to the directory. If there is not enough space in the private region(s) assigned to a directory, one or more additional regions may be assigned to the directory from a higher level allocator. Once assigned to the directory, these additional region(s) may also become private to the directory. Files created or extended for other entities may not have access to the private region(s) assigned to the directory.

Space in a region may be reserved for future operations with respect to the region. For example, in copy on write techniques, a copy of data may be made before modifying the data. As another example, certain files may be known to grow over time. Reserving space in a region may make these and other operations more efficient. Reserving space in a region may also avoid contention, particularly when the region is private. The amount of space to reserve may be specified in terms of percentage, number of blocks, size, or in some other fashion.

In allocating free space from a region, a lock may be acquired on a portion of the hierarchical data structure. For example, in allocating free space from region associated with the node 217, a lock may be acquired for the data associated with the node 217. While this lock may prevent another allocation requestor from simultaneously allocating space associated with the node 217, it does not prevent allocators from allocating space from regions associated with other nodes.

Figure 4:
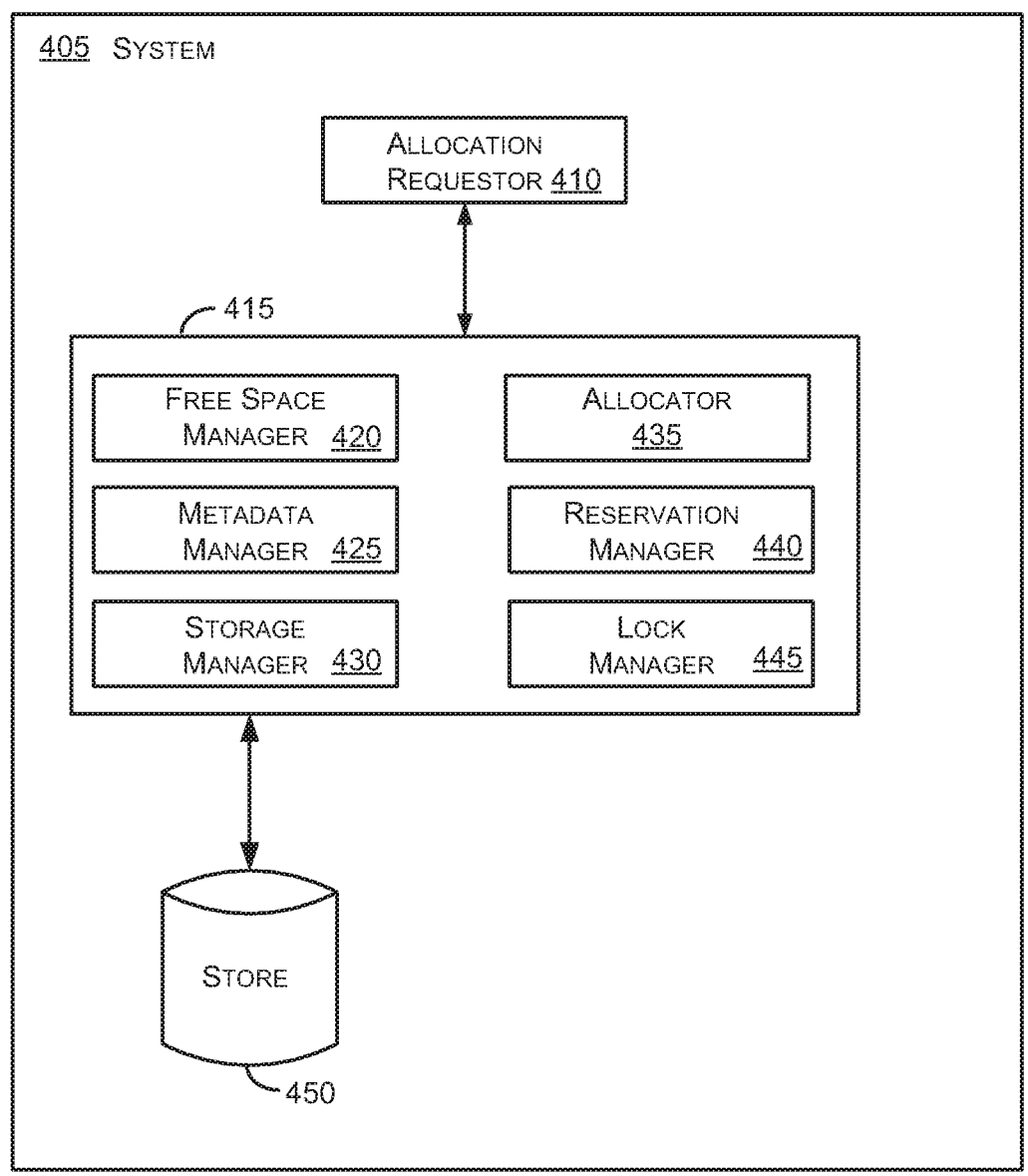
FIG. 4 is a block diagram that represents a system configured in accordance with aspects of the subject matter described herein.

FIG. 4 is a block diagram that represents a system configured in accordance with aspects of the subject matter described herein. The components illustrated in FIG. 4 are exemplary and are not meant to be all-inclusive of components that may be needed or included. In other embodiments, the components and/or functions described in conjunction with FIG. 4 may be included in other components (shown or not shown) or placed in subcomponents without departing from the spirit or scope of aspects of the subject matter described herein. In some embodiments, the components and/or functions described in conjunction with FIG. 4 may be distributed across multiple devices.

Turning to FIG. 4, the system 405 may include an allocation requestor 410, allocation components 415, a store 450, and other components (not shown). The allocation components 415 may include a free space manager 420, a metadata manager 425, a storage manager 430, an allocator 435, a reservation manager 440, a lock manager 445, and other components (not shown). The system 405 may be implemented on or by one or more computers (e.g., the computer 110 of FIG. 1).

The actions of the one or more of the allocation components 415 may be performed by one or more processes. The term "process" and its variants as used herein may include one or more traditional processes, threads, components, libraries, objects that perform tasks, and the like. A process may be implemented in hardware, software, or a combination of hardware and software. In an embodiment, a process is any computer mechanism, however called, capable of or used in performing an action. A process may be distributed over multiple devices or a single device.

In one embodiment, the allocation components 415 may be implemented as methods of an allocator object. In another embodiment, one or more of the allocation components 415 may be implemented as one or more functions. The term "function" as used herein may be thought of as a portion of code that performs one or more tasks. Although a function may include a block of code that returns data, it is not limited to blocks of code that return data. A function may also perform a specific task without returning any data. Furthermore, a function may or may not have input parameters. A function may include a subroutine, a subprogram, a procedure, method, routine, or the like.

The allocation requestor 410 is any entity that seeks to obtain storage from the allocation components 415. Some exemplary entities include applications, operating system components, databases, allocators (in implementations with multiple allocators), and the like. The allocation requestor 410 may reside on an apparatus hosting one or more of the allocation components 415 or may reside on a different apparatus.

The store 450 comprises any storage media capable of storing files and that is managed by a file system. The store 450 may be external, internal, or include components that are both internal and external to the system 405. The term file as used herein includes directories, files, other file system objects, and the like. As used herein a file includes data.

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The free space manager 425 is operable to search allocation data of a node to find free space on the storage device to allocate for an allocation request. As mentioned previously, the allocation data may be arranged in a hierarchical data structure where the hierarchical data structure indicates relationships (e.g., hierarchical) between pairs of nodes at different levels of the hierarchical data structure.

Two directly related nodes (e.g., nodes in a parent/child relationship) indicate allocation data for some of the storage at different levels of granularity. For example, referring to an example described in conjunction with FIG. 2, the node 215 may include allocation data (e.g., at location 220) that indicates allocation data at a 1 gigabyte granularity that corresponds to allocation data (e.g., node 216's allocation data) that indicates allocation data for the same 1 gigabyte but at a 1 megabyte granularity.

Also, note that the allocation data illustrated for each of the nodes may represent contiguous regions of storage associated with the nodes. For example, the allocation data at the locations next to location 221 may represent storage available on a storage device that is physically contiguous with the storage represented by location 221.

Also as mentioned previously, the allocation data for each node indicates whether portions of the region associated with the node are allocated (from the node's perspective).

The metadata manager 425 may operate to update allocation data of a node in response to storage associated with the node being allocated to (or freed by) an allocation requestor. The metadata manager 425 may also update bitmap or other allocation representation data to reflect allocation status and other allocation data (e.g., the data in the header) as mentioned previously.

The storage manager 430 is operable to store and provide access to files of a storage device. The storage manager 430 may include low level routines that are able to communicate with the hardware of a storage device.

The allocator 435 is operable to utilize the free space manager 420 to find the free space for the allocation request. An allocator may be further operable to utilize the metadata manager 425 to update the allocation data in conjunction with allocating space for the allocation request. In one embodiment, the functions of the free space manager 420 and the metadata manager 425 may be included in the allocator itself.

The reservation manager 440 may be operable to reserve additional space for an allocation request. For example, the reservation manager 440 may increase the space requested by an allocation request to ensure that additional space is available for subsequent operations involving the allocated space as mentioned previously. In one embodiment, the allocator 435 may automatically reserve additional space when allocating space and the reservation manager 440 may be omitted.

The lock manager 445 may be operable to lock portions of a hierarchical allocation data structure in conjunction with allocating space for an allocation request. In locking one portion of the hierarchical data structure, the lock manager 445 may allow other portions of the hierarchical data structure to be independently locked (e.g., for other allocation requests) concurrently with the locked portion.

In embodiments where there are more than one allocator, one or more of the allocation components 415 may be duplicated for use with the allocators.

Although the environments described above includes various numbers of the entities, it will be recognized that more, fewer, or a different combination of these entities and others may be employed without departing from the spirit or scope of aspects of the subject matter described herein. Furthermore, the entities may be configured in a variety of ways as will be understood by those skilled in the art without departing from the spirit or scope of aspects of the subject matter described herein.

Figure 5:
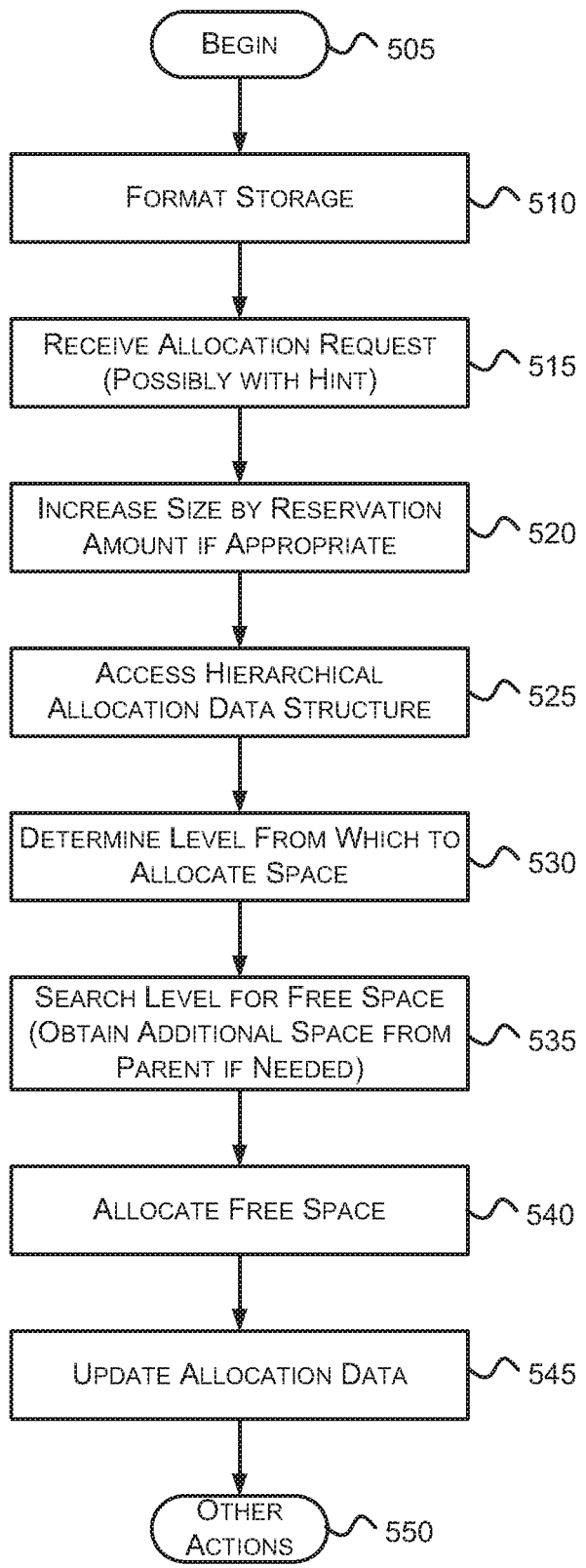
FIGS. 5-6 are flow diagrams that generally represent actions that may occur in accordance with aspects of the subject matter described herein.
Figure 6:
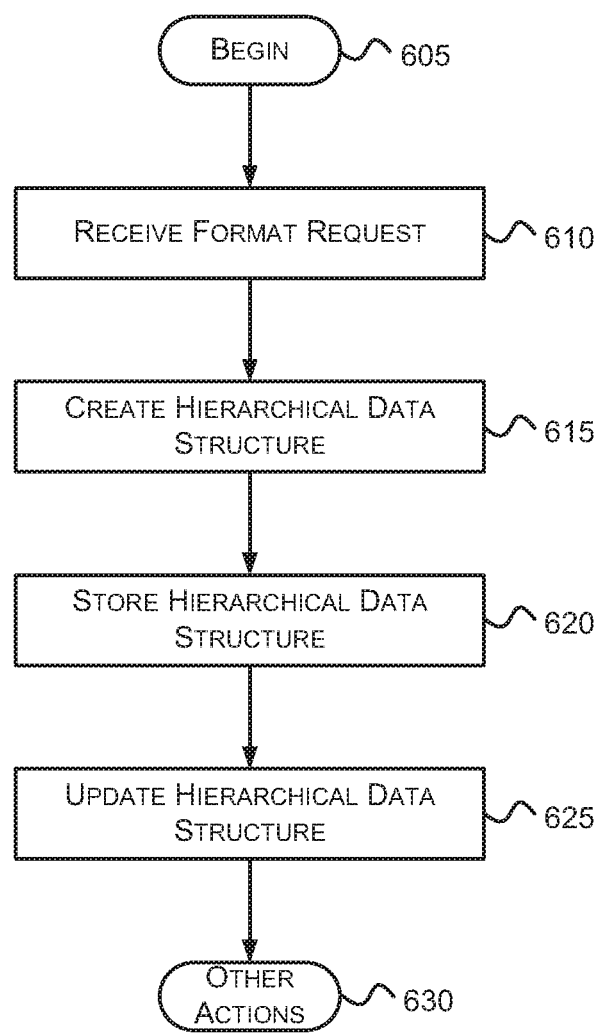

FIGS. 5-6 are flow diagrams that generally represent actions that may occur in accordance with aspects of the subject matter described herein. For simplicity of explanation, the methodology described in conjunction with FIGS. 5-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 5, at block 505, the actions begin. At block 510, storage may be formatted. For example, referring to FIG. 4, the storage manager 430 may format the store 450. In conjunction with formatting the storage, a hierarchical data structure (e.g., such as the one illustrated in FIG. 2) may be created and stored on the storage. When it is first created, the hierarchical data structure may have one or more nodes in the highest level that represent the free space of the storage. The other levels may have zero nodes until storage from the levels is allocated.

At block 515, an allocation request is received. For example, referring to FIG. 4, an allocation request may be received from the allocation requester 410. The allocation request is a request to allocate storage from a store managed by a file system. The allocation request may come in conjunction with a hint at a desired location from which or close to storage is to be allocated.

At block 520, the size requested by the allocation may be increased by a reservation amount if appropriate. For example, referring to FIG. 4, the reservation manager 440 may increase the size requested by the allocation to ensure that additional space is reserved for subsequent operations as described previously. In cases where reservation of additional space is not desired, the actions of this block may be omitted.

At block 525, a hierarchical data structure is accessed. For example, referring to FIGS. 2-3, the data structure 205 may be accessed. The data structure 205 may include multiple of the data structures 305 of FIG. 3. As mentioned previously, the hierarchical data structure includes data regarding allocated and non-allocated space on the storage. This data indicates a plurality of regions of the storage. The data further indicates relationships between pairs of nodes at different levels of the hierarchical data structure. Two directly related nodes (e.g., a parent and child node) indicate allocation data for some of the storage at different levels of granularity as mentioned previously.

At block 530, a level of the hierarchical data structure is determined for allocation space for the request. For example, referring to FIGS. 2 and 4, the allocator 435 may determine to use the level 216 in satisfying a request for multiple megabytes of storage. As another example, if an allocation requestor explicitly requests a certain level, the allocator 435 may, but is not required, to use that level.

At block 535, one or more nodes of the determined level are searched for free space. For example, referring to FIG. 2, one or more nodes of the level 211 may be searched for suitable free space. If enough free space is not available, additional space may be allocated from a parent node. Then space including that obtained from the additional space may be allocated to satisfy the allocation request.

At block 540, free space is allocated for the allocation request. For example, referring to FIG. 2, space from the node 217 may be allocated to satisfy an allocation request.

At block 545, the allocation data is updated to indicate that the free space has been allocated. For example, referring to FIG. 3, a bitmap or other data structure may be updated to indicate that the free space has been allocated.

At block 550, other actions, if any, may be performed.

Turning to FIG. 6, at block 605, the actions begin. At block 610, a request to format storage of a file system is received. For example, referring to FIG. 4, a file system may receive a request to format a volume of the store 450.

At block 615, in response to the request, a hierarchical data structure is created. The hierarchical data structure includes allocation data regarding the storage. As indicated previously, the hierarchical data structure is capable of indicating allocation of regions of the storage at different levels of granularity. The hierarchical data structure includes one or more nodes associated with the regions of the storage where each node includes allocation data regarding an associated region of the storage. The allocation data of a node is independently lockable from the allocation data of another node.

For example, referring to FIG. 2, a hierarchical data structure like the hierarchical data structure 205 may be created. When the hierarchical data structure is initially created it may only have one level as after formatting the storage may have no allocated storage. Where a root directory is created during the formatting, there may be multiple levels created when the root directory consumes space from the storage.

At block 620, the hierarchical data structure may be stored on the storage. For example, referring to FIG. 4, after creating a hierarchical data structure, the hierarchical data structure may be stored on the store 450.

At block 625, the hierarchical data structure may be updated. For example, a region associated with a node may be marked for exclusive use for a directory of the file system. As another example, a child node in one level may be created, allocation data of a parent node may be modified to indicate that storage has been allocated to the child node, and allocation data may be initialized in the child node to indicate that the storage allocated to the child node is allocable via the child node. This may involve updating bitmaps or other appropriate data structures as previously mentioned.

As another example, header information for each node of the hierarchical data structure may be updated to include a value indicative of a physical location on the storage of a region of the node, a value indicative of a size of the region, and a value indicative of a number of bits in the bitmap representing allocation data of the region. The header information may also be updated, for example, with a value indicative of an amount of non-allocated space of the region of the node and a value indicative of a largest contiguous non-allocated space of the region of the node.

At block 630, other actions, if any, may be performed.

As can be seen from the foregoing detailed description, aspects have been described related to storage allocation. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method performed on a computing device, the method comprising:
   allocating, by the computing device, portions of storage space on a storage device according to levels of a hierarchy and nodes of the levels, where each level represents a different granularity of the storage space, where each level comprises its corresponding nodes, where each node represents a region of the storage space, and where each node indicates: a size of the region, a number of allocation units in the region, a size of each allocation unit, and a largest contiguous size of non-allocated space in the region.

2. The method of claim 1 further comprising creating the hierarchy in response to a request to format the storage space.

3. The method of claim 2 further comprising storing the hierarchy on the storage device.

4. The method of claim 1 further comprising marking one of the regions for exclusive use for a directory of a file system.

5. The method of claim 1 where each node has a corresponding data structure that includes a header and a bitmap.

6. The method of claim 5 where the header indicates a physical location of the each node's region on the storage device.

7. The method of claim 5 where the header indicates an allocation size of allocation units represented by bits of the bitmap.

8. A computing device comprising:
   at least one processor;
   memory coupled to the at least one processor; and
   an allocator implemented at least in part by the at least one processor and via which the computing device allocates portions of storage space of a storage device according to levels of a hierarchy and nodes of the levels, where each level represents a different granularity of the storage space, where each level comprises its corresponding nodes, where each node represents a region of the storage space, and where each node indicates: a size of the region, a number of allocation units in the region, a size of each allocation unit, and a largest contiguous size of non-allocated space in the region.

9. The computing device of claim 8 further comprising the computing device being configured to create the hierarchy in response to a request to format the storage space.

10. The computing device of claim 9 further comprising the computing device being configured to store the hierarchy on the storage device.

11. The computing device of claim 8 further comprising the computing device being configured to mark one of the regions for exclusive use for a directory of a file system.

12. The computing device of claim 8 where each node has a corresponding data structure that includes a header and a bitmap.

13. The computing device of claim 12 where the header indicates a physical location of the each node's region on the storage device.

14. The computing device of claim 12 where the header indicates an allocation size of allocation units represented by bits of the bitmap.

15. A method performed on a computing device, the method comprising:
   allocating, by the computing device, portions of storage space of a storage device according to levels of a hierarchy and nodes of the levels, where each level represents a different granularity of the storage space, where each level comprises its corresponding nodes, where each node represents a region of the storage space, and where each node indicates: a size of the region, a number of allocation units in the region, a size of each allocation unit, and a largest contiguous size of non-allocated space in the region;
   determining, by the computing device based on a request for space, a level of the hierarchy that represents a granularity of the storage space sufficient for the requested space;
   searching, by the computing device, nodes of the determined level for a node with sufficient contiguous size of non-allocated space;
   allocating, by the computing device in response to the searching succeeding, the sufficient contiguous size of non-allocated space; and
   allocating, by the computing device in response to the searching succeeding, storage space sufficient for the requested space from a parent node in a next-higher level in the hierarchy from the determined level.

16. The method of claim 15, the actions further comprising creating the hierarchy in response to a request to format the storage space.

17. The method of claim 16, the actions further comprising storing the hierarchy on the storage device.

18. The method of claim 15, the actions further comprising marking one of the regions for exclusive use for a directory of a file system.

19. The method of claim 15 where each node has a corresponding data structure that includes a header and a bitmap.

20. The method of claim 19 where the header indicates:
- a physical location of the each node's region on the storage device; or
- an allocation size of allocation units represented by bits of the bitmap.

* * * * *